United States Patent [19]
Koenck

[11] Patent Number: 5,979,768
[45] Date of Patent: Nov. 9, 1999

[54] ENHANCED BAR CODE RESOLUTION THROUGH RELATIVE MOVEMENT OF SENSOR AND OBJECT

[75] Inventor: Steven E. Koenck, Cedar Rapids, Iowa

[73] Assignee: Intermec I.P. Corp., Woodland Hills, Calif.

[21] Appl. No.: 08/476,226

[22] Filed: Jun. 7, 1995

Related U.S. Application Data

[62] Continuation-in-part of application No. 08/360,014, Dec. 20, 1994, abandoned, application No. 08/040,313, Mar. 29, 1993, Pat. No. 5,468,947, and application No. 08/345,268, Nov. 28, 1994, abandoned, which is a continuation of application No. 07/972,822, Nov. 6, 1992, abandoned, which is a continuation-in-part of application No. 07/616,602, Nov. 21, 1990, which is a continuation-in-part of application No. 07/238,701, Aug. 31, 1988, Pat. No. 5,019,699, said application No. 08/040,313, is a continuation-in-part of application No. 07/451,322, Dec. 15, 1989, Pat. No. 5,227,614, which is a continuation-in-part of application No. 07/143,921, Jan. 14, 1988, abandoned, said application No. 08/360,014, is a continuation of application No. 07/777,393, filed as application No. PCT/US90/03282, Jun. 7, 1990, Pat. No. 5,410,141, and a continuation-in-part of application No. 07/364,594, Jun. 7, 1989, abandoned, and application No. 07/364,902, Jun. 8, 1989, abandoned.

[51] Int. Cl.$^6$ .............................................. G06K 7/10
[52] U.S. Cl. ................ 235/470; 235/462.12; 235/462.41
[58] Field of Search .................... 235/462, 463, 235/470, 462.12, 462.41; 382/289, 266

[56] References Cited

U.S. PATENT DOCUMENTS

| | | | |
|---|---|---|---|
| 4,588,882 | 5/1986 | Buxton | 235/487 |
| 4,691,367 | 9/1987 | Wevelsiep | 382/296 |
| 4,723,297 | 2/1988 | Postl | 382/289 |
| 4,728,784 | 3/1988 | Stewart . | |
| 4,866,784 | 9/1989 | Barski | 382/289 |
| 4,916,297 | 4/1990 | Tukada et al. . | |
| 4,953,228 | 8/1990 | Shigemitsu et al. | 382/125 |
| 4,988,852 | 1/1991 | Krishnan | 235/462 |
| 5,093,653 | 3/1992 | Ikehira | 345/126 |
| 5,124,537 | 6/1992 | Chandler et al. . | |
| 5,128,526 | 7/1992 | Yoshida | 235/456 |
| 5,136,145 | 8/1992 | Karney | 235/472 |
| 5,200,598 | 4/1993 | Rencontre | 235/472 |
| 5,245,676 | 9/1993 | Spitz | 382/235 |
| 5,262,623 | 11/1993 | Batterman et al. . | |
| 5,296,690 | 3/1994 | Chandler et al. . | |
| 5,296,691 | 3/1994 | Waldron et al. . | |

(List continued on next page.)

FOREIGN PATENT DOCUMENTS

| | | |
|---|---|---|
| 449 645 | 10/1991 | European Pat. Off. . |
| 449634 | 10/1991 | European Pat. Off. . |
| 484132 | 5/1992 | European Pat. Off. . |
| 450 878 | 5/1997 | European Pat. Off. . |
| 524 029 | 1/1999 | European Pat. Off. . |
| WO 92/00576 | 1/1992 | WIPO . |
| WO 98/16896 | 4/1998 | WIPO . |

OTHER PUBLICATIONS

Ben G. Streetman, "Solid State Electronic Devices" 1980, p. 362.

*Primary Examiner*—Donald Hajec
*Assistant Examiner*—Mark Tremblay
*Attorney, Agent, or Firm*—Cowan, Liebowitz & Latman, P.C.; R. Lewis Gable

[57] ABSTRACT

An improved method and apparatus for enhancing the resolution of an image of an object by a sensor is described by operating the sensor to capture a two-dimensional image of the object. In particular, one of the sensor and the object is moved with respect to the other from a first position to a second position. In the second position, electrical signals are outputted by the sensor's pixels aligned with a sampling line that is disposed at an acute angle with respect with a reference line of the object, whereby the resolution of the resultant object image is enhanced.

16 Claims, 7 Drawing Sheets

U.S. PATENT DOCUMENTS

| | | | |
|---|---|---|---|
| 5,343,028 | 8/1994 | Figarella et al. | 235/462 |
| 5,378,881 | 1/1995 | Adachi | 235/462 |
| 5,387,787 | 2/1995 | Waldron et al. . | |
| 5,396,054 | 3/1995 | Krichever et al. . | |
| 5,438,188 | 8/1995 | Surka . | |
| 5,444,231 | 8/1995 | Shellhammer et al. . | |
| 5,457,308 | 10/1995 | Spitz et al. . | |
| 5,478,999 | 12/1995 | Figarella et al. . | |
| 5,489,769 | 2/1996 | Kubo | 235/462 |
| 5,504,322 | 4/1996 | Pavlidis et al. | 235/494 |
| 5,512,739 | 4/1996 | Chandler et al. | 235/462 |
| 5,545,887 | 8/1996 | Smith et al. | 235/462 |
| 5,550,365 | 8/1996 | Klancnik et al. | 235/462 |
| 5,832,139 | 11/1998 | Batterman et al. . | |
| 5,856,844 | 1/1999 | Batterman et al. . | |

ENHANCED BAR CODE RESOLUTION THROUGH RELATIVE MOVEMENT OF SENSOR AND OBJECT

REFERENCE TO RELATED APPLICATIONS

Cross-reference is made to the following related patent applications:

(1) The present application is a continuation-in-part of U.S. Ser. No. 08/360,014, entitled "Hand-Held Data Capture System With Interchangeable Modules," filed Dec. 20, 1994 in the names of Koenck et al., now abandoned, which is a continuation of U.S. Ser. No. 07/777,393, entitled "Hand-Held Data Capture system With Interchangeable Modes," filed Jan. 7, 1992 in the names of Koenck et al., now U.S. Pat. No. 5,410,141 which is the U.S.A. national phase of International Application No. PCT/US/90/03282, entitled "Hand-Held Data Capture System With Interchangeable Modules" with an International Filing Date of Jun. 7, 1990 in the names of Steven E. Koenck et al., and is a continuation-in-part of U.S. Ser. No. 07/364,902, entitled, "Modular Hand-Held System Capable of Bar Code Scanning and On-Line RF Transmission of Scanning Data", filed Jun. 8, 1989 in the names of Arvin D. Danielson, and Darald R. Schultz, now abandoned, and of U.S. Ser. No. 07/364,594, entitled "Hand-Held Computer Terminal" filed Jun. 7, 1989 in the names of Keith K. Cargin et al., now abandoned.

(2) The present application is also a continuation-in-part of U.S. application Ser. No. 08/040,313, entitled "Pocket Size Data Capture Unit With Processor and Shell Modules", filed Mar. 29, 1993, now U.S. Pat. No. 5,468,947 which is a continuation-in-part of U.S. application Ser. No. 07/451,322, entitled "Core Computer Processor Module, and Peripheral Shell Module Assembled to Form a Pocket Size Data Capture Unit" filed Dec. 15, 1989 in the names of Arvin A. Danielson and Dennis A. Durbin, now U.S. Pat. No. 5,227,614, which is a continuation-in-part of U.S. application Ser. No. 07/143,921, entitled "Core Computer Processor Module, and Peripheral Shell Module Assembled to Form a Pocket Size Data Capture Unit" filed Jan. 14, 1988 in the names of Arvin A. Danielson and Dennis A. Durbin, now abandoned.

(3) The present application is also a continuation-in-part of U.S. application Ser. No. 08/345,268, entitled "Hand-Held Optical Reader With Means For Instantaneous Reading Information From A Predetermined Area," filed Nov. 28, 1994 in the name of S. Koenck, now abandoned, which is a continuation of U.S. application Ser. No. 07/972,822 entitled "Hand-Held Optical Reader With Means for Instantaneous Reading Information From A Predetermined Area," filed Nov. 6, 1992 in the name of S. Koenck (now abandoned), which is a continuation-in-part of U.S. patent application Ser. No. 07/616,602, entitled "Hand-Held Optical Reader With Means For Instantaneous Reading Information From A Predetermined Area," filed Nov. 21, 1990 in the name of S. Koenck (now abandoned), which is a continuation-in-part of U.S. application Ser. No. 07/238,701, entitled "Hand-Held Optical Character Reader With Means For Instantaneously Reading Information From A Predetermined Area At An Optical Sensing Area," filed Aug. 31, 1988 in the name of Steven E. Koenck, now U.S. Pat. No. 5,019,699.

(4) U.S. application Ser. No. 07/707,954, entitled "Hand-Held Computerized Data Collection Terminal with Rechargeable Battery Pack Sensor and Battery Power Conservation", filed May 22, 1991 in the names of Keith K. Cargin et al., now abandoned.

(5) U.S. application Ser. No. 07/399,330, entitled "Hand-Held Computer Terminal" filed Apr. 14, 1989 in the names of Keith K. Cargin et al., now abandoned.

(6) Ser. No. 06/897,547, entitled "Core Computer Processor Module, and Peripheral Shall Module Assembled to Form a Pocket Size Data Capture Unit," filed in the names of Dennis A. Durbin, Stephen J. Kelley, et al. Filed Aug. 15, 1986, now abandoned.

(7) U.S. Ser. No. 07/744,813, entitled "Modular Hand-Held System Capable of Bar Code Scanning And On-line RF Transmission of Scanning Data," filed Aug. 12, 1991 in the names of Arvin D. Danielson and Darald r. Schultz, now abandoned.

Ser. No. 08/515,035, filed Aug. 14, 1995 in the names of Mark Y. Shimizu et al. and entitled, "RESOLUTION GAIN ON WIDTH MODULATED BAR CODES BY USE OF ANGLED SAMPLING IN TWO DIMENSIONS".

Incorporate by reference each of the above-listed U.S. applications and patents.

BACKGROUND OF THE INVENTION

This invention generally relates to data collection systems wherein a hand-held unit is operated from battery power and functions to collect and process data by a sequence of automated and manual operations. typical automated process is the non-Contact scanning of bar code data by means of a cyclically deflected laser beam or with the use of an image photosensor of the CCD type. Once a valid bar code reading has been obtained, a keyboard may be manually operated to indicate an associated quantity. The user may then manually initiate a further operation, for example, the on-line transmission of the data to a remote host computer, e.g. via a radio frequency communications link.

The presently known data capture devices which include a user interface such as a keyboard and display, and a non-contact automatic reader function have tended to be highly specialized, bulky and expensive. In a prior art device having the desired functions, it may be necessary to completely invert the device after a bar code reading, in order to view the display, and/or to actuate the keyboard.

Devices which essentially add a keyboard and display to an existing scanner design may be particularly awkward to use, for example because the keyboard and display are applied at the forward end of the scanner where they are not conveniently accessible and where manual forces applied to the keyboard are tedious to counteract with the supporting handle which is much closer to the user's body.

It would be desirable to have a basic data capture terminal which is light weigh and compact, and which could be readily converted for on-line wireless communications and bar code scanning as needed. Such a versatile data capture system would be particularly suitable for small scale operations where low cost is a major objective, and versatility of the terminal unit is especially advantageous. Furthermore, in order to realize the benefits of mass production, it is desirable from the manufacturer's standpoint if a basic computerized terminal configuration can be readily adapted to the needs of diverse end users by the selective addition of low cost modules.

SUMMARY OF THE INVENTION

It is a significant feature of this invention to provide an improved method of processing pixel image data derived from a bar code, wherein the bar code comprises a series of elements disposed parallel to each other. The width of the bar code elements and the spacing therebetween define the information coded by the bar code. The series of bar code elements have an axis disposed perpendicular to the bar code elements. In particular, the method of processing comprises the step of generating an image of the bar code comprised of a plurality of scans of the bar code elements. Each scan comprises a plurality of image pixels representative of the series of bar code elements therein. Next, the bar code image is stored within a memory. The memory comprises a plurality of memory cells arranged orthogonally in columns and rows for storing respective ones of the image pixels. The bar code image is stored in the memory so that the plurality of scans lie in a like plurality of rows of the memory.

In a further aspect of this invention, the bar code image is stored in the memory so that the axis of bar code image lies at an angle with respect to the rows of the memory, whereby the corresponding image pixels of adjacent scans are "phase shifted" from each other. The rows are read to output an electrical signal indicative of the pixel image of its corresponding scan. Each of the electrical signals is sampled at a relatively slow rate to provide a corresponding set of signal samples. The sets of signal samples corresponding to the plurality of scans are combined to provide a resultant sampled signal of a sample rate effectively greater than the slow rate.

In a further feature of this invention, wherein the orientation of the axis of the bar code with respect to the columns is unknown, the angle between the bar code axis and the columns is determined and, if greater than zero degrees, the bar code is rotated until the bar code axis lies parallel to the columns (or rows). The corresponding image pixels of different memory lines are compared for the purpose of determining the validity of the bar code image.

BRIEF DESCRIPTION OF THE DRAWINGS

FIGS. 2D, E and F respectively represent the phase shift provided from reading out the rotated image pixel signal from a plurality of the memory rows, the relatively fast effective sample clock and the resultant sampled signal.

Hand-held bar code readers that have been available in the past have not performed well. The reader must be positioned accurately during the entire movement across the label for a valid read to occur. Operators usually "scrub" the label with the reader rather than carefully aligning the reader on the label, and often give up and manually key the information into the terminal. The primary reason that accurate alignment is required is that the reader uses either a linear matrix of sensing elements, say sixty-four, or a rectangular matrix of sensing elements, say fourteen by forty. The recognition algorithms typically used in these systems assume that the sensor is oriented accurately over or across the character to be read. The operator's guides for the present products instruct the operator to hold the reader exactly perpendicular, centered on the edge of the line to be read, not tilted, skewed, angled or rocked, and to hold this alignment during the sweep across the label. It is unsurprising that few operators use the readers in this way, and that poor read rates and dissatisfaction with the criticality of the reader alignment during scanning, have been serious problems.

Figure 1A:
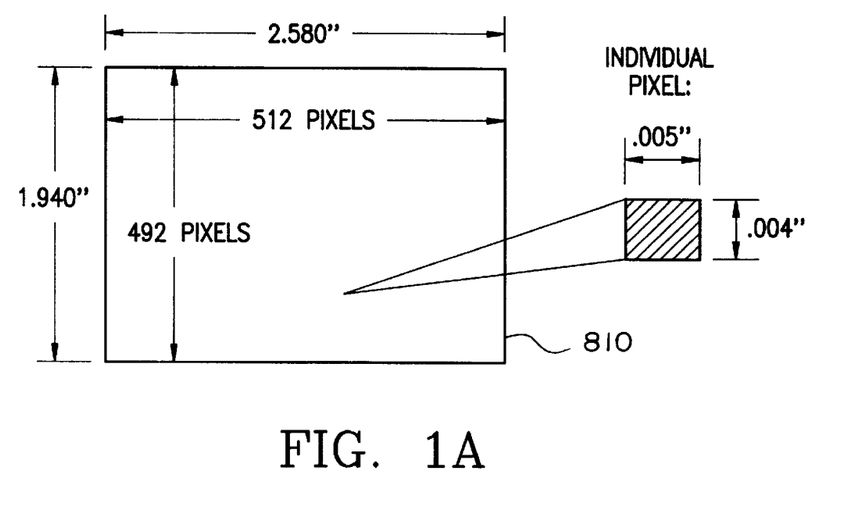
FIG. 1A is a diagram for illustrating the optical sensing area which results from the use of a typical solid state video imaging array and a lens system with a magnification ratio of ten to one, in a hand-held optical reader in accordance with the present invention.
Figure 1B:
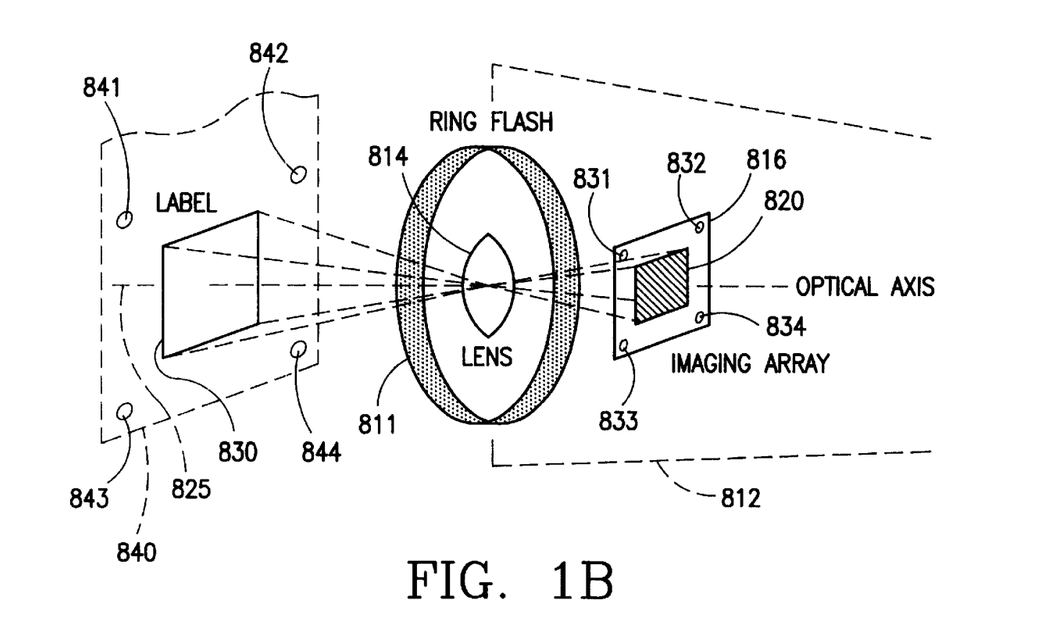
FIG. 1B is a diagrammatic illustration of a preferred form of hand-held optical reader according to the present invention, arranged so as to have its optical sensing area completely encompassing the machine-readable code (e.g., bar code) or human-readable information (e.g., line or lines of text) on a label so that a complete instantaneous optical image thereof is converted by the reader into digital image data and stored in a processor memory of the reader.

In FIG. 1B, a hand-held area type bar code reader according to the present invention is illustrated for reading all the characters, bar codes or other information at an optical sensing area such as indicated at 810 in FIG. 1A, essentially instantaneously. The area 810 to be read may be illuminated by a ring type flash illuminator 811, preferably a xenon flash tube. A hand-held scanner unit indicated by dash lines 812 may house light source 811, a lens 814 and a solid state area type photosensor array such as indicated at 816 with a density of photosensor elements to provide the resolution illustrated in FIG. 1B, that is an individual pixel of 0.004 inch by 0.005 inch (four mils high by five mils wide).

Once the flash energization of the light source is complete, and the image of the object is captured on the photosensor array 816 the photosensor array 816 may be read out, each line of photosensor elements or pixels of the array being shifted out serially for example, and the respective lines of photosensor elements being read out in parallel for example to an analog logic interface component including a memory within the hand-held scanner unit 812. A signal processor in the scanner unit 812 and connected with the analog/logic interface component may receive the area image data and supply the raw area image data to an associated memory, as will be discussed below with respect to FIG. 1C, in the hand-held scanner unit 812 for subsequent processing in the hand-held unit, or the raw area image data (e.g., in digital form) may be coupled via an RF or optical link to a host processor for storage and processing. Where the focused information image, e.g., at 820, FIG. 1B, on the photosensor array 816 is tilted relative to the longitudinal (widthwise) axis of the array 816, the raw image data as stored in the noted memory in digital form may be subsequently processed so as to be rotated into a normal horizontal disposition prior to decoding thereof by well known algorithms. The flash tube 811 and lens 814 may have circular symmetry relative to their longitudinal axis 825 so that any angle of tilt of label 830 about axis 825 is not detrimental to uniform optical imaging of the entire information field.

Marker beams originating from light sources 831 to 834 at the four corners of area photosensor array 816 may be projected onto a supporting surface 840 carrying label 830, via optics 814, to produce marker spots 841–844, so that array 816 may be readily aligned relative to area information, e.g., on label 830, as the hand-held unit 812 is being moved into proximity thereto. By way of example, photodiodes 831 to 834 at the four corners of the photosensor array 816 may be sequentially pulsed so that the marker spots 841–844 are each produced at a repetition rate of sixty per second when the hand-held scanner unit is placed in a target seeking mode. Once the four marker spots "bracket" the information to be read, as in FIG. 1B, regardless of tilt, or regardless of whether the information extends horizontally or vertically, the light source 811 may be triggered, marker spots 841–844 being extinguished by this time, or the wave length thereof being prevented from affecting the photosensor array by filtering, for example.

In FIG. 1A, an optical sensing area is delineated which represents the result of the use of the solid state video imaging array with a lens system that provides a magnification ratio of ten to one, as described above. The resultant active area is 2.58 inches×1.94 inches as indicated.

In an advantageous embodiment, the height dimension of the complete image area array 816 may be such that a complete area information image including the entire area information width, e.g., of an eighty column line of characters, can be read whether the width of the information image is disposed widthwise or heightwise or diagonally on photosensor array 816.

With signature verification, and also with bar code reading of bar codes at random angles, the digital image obtained can be displayed on a display of the terminal along with a normalization line. The operator can rotate the normalization line with a manual control to indicate any pronounced slant of the signature or to indicate the angle of a single or multiple bar code stored image. The processing program can rotate the stored image, and display the normalized signature or bar code image prior to validation processing or decoding.

Figure 1C:
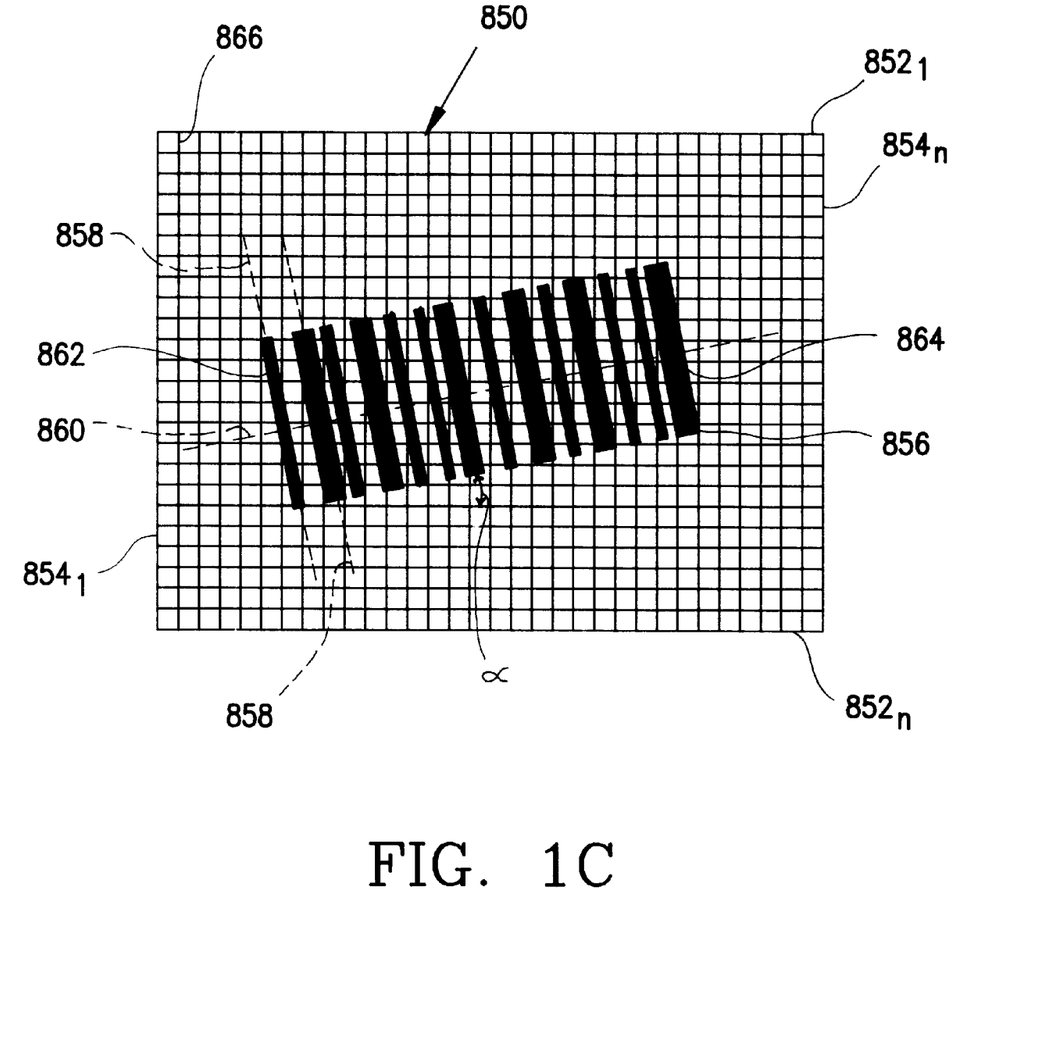
FIG. 1C is a diagrammatic illustration of a memory for storing image pixel signals derived from the hand-held optical reader of FIG. 38B and indicative of a bar code as illustrated.

In FIG. 1C, there is shown a memory 850, which comprises an array of memory cells 866 disposed at the points of intersection of a first set of memory lines 852-1 to 852-n and a second set of memory lines 854-1 to 854-n. As is well understood in the art, the memory lines 852 are oriented horizontally along the rows of the memory 850, while the memory lines 854 are disposed vertically to form the columns of the memory 850.

In FIGS. 3–6, there is shown related methods of operating the reader shown in FIG. 1A. An image 856 of a bar code is produced in step 870 by the bar code scanner 812 as described above. In particular, signals indicative of the image pixels comprising the bar code image 820 are readout in step 872 and transferred or stored in step 880 from the image array 816 to the memory 850. As illustrated in FIG. 1C, the pixel signal defining the bar code image 856 are initially loaded into the memory 850 at a skewed or offset angle α with respect to the horizontally disposed memory lines 852 or rows of the memory 850. This offset, as explained above, results from the inability of the scanner operator to precisely align the bar code image 856 and the optical sensing area 810 when the bar code image 820 is taken.

The illustrated bar code image 856 represents a plurality of bar code elements 862 and 864, all of a common height, some elements 862 having a first, relatively narrow width and other elements 864 of a second, relatively broad width. Further, the spacings between the bar code elements 862 and 864 vary, some spacings are a relatively small, first spacing and other spacings are a relatively large, second spacing. It is recognized by those skilled in the art that the data coding imported to the bar code image 856 is implemented by the selection of these first and second widths and first and second spacings. Further, each of the bar code elements 862 or 864 has an element axis 858, while the entire bar code has a bar code axis 860, noting that the bar code axis 860 is perpendicular to the axis 858 of the bar code elements 862 and 864.

The processing of the digital signal representative of the bar code image 856, i.e., the pixels as stored in the array of memory cells 866, will now be described. In one embodiment of this invention the stored pixel image of the bar code 856 is normalized, i.e., the image now disposed at an offset angle is rotated, to a position where its axis 860 is in a parallel relationship with the horizontally disposed rows 852 or the vertically disposed columns 854 of the memory 850.

Figure 3:
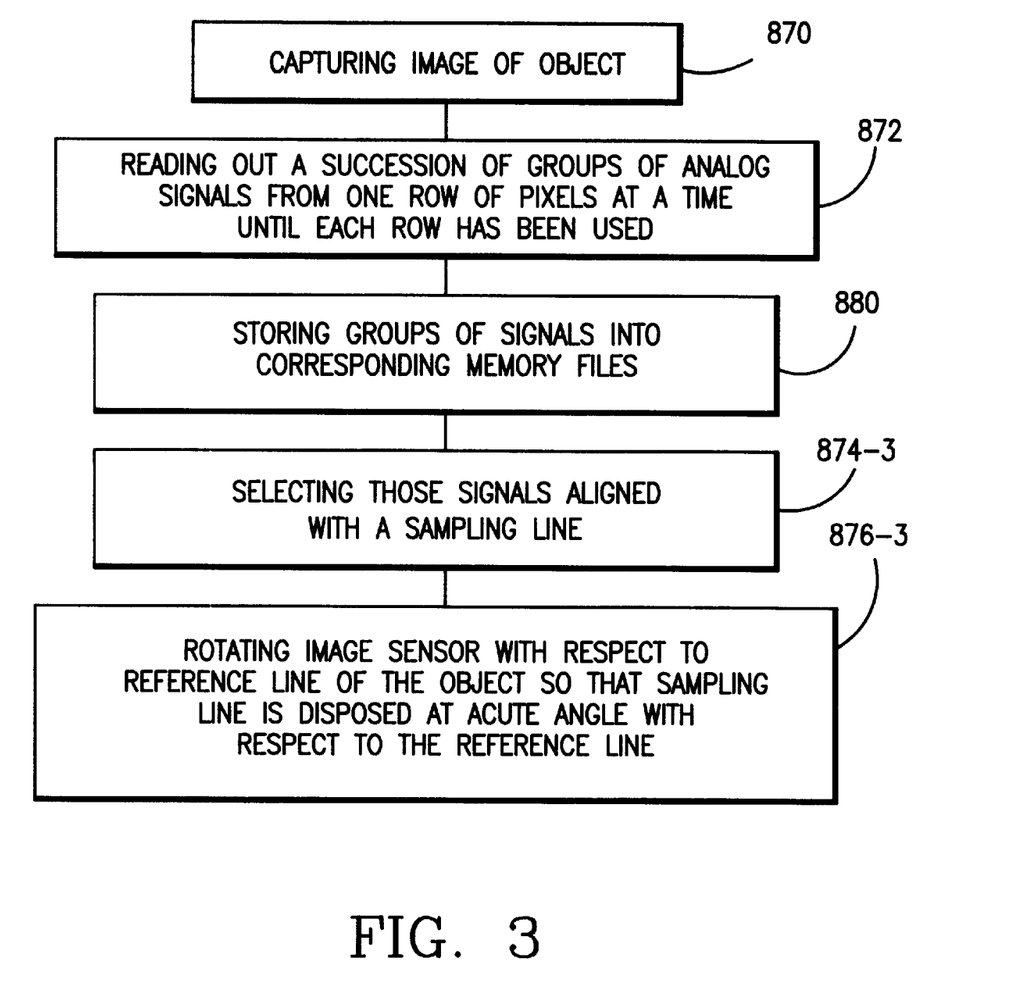
FIG. 3 is a diagram of the process of enhancing the resolution of an object image.
Figure 4:
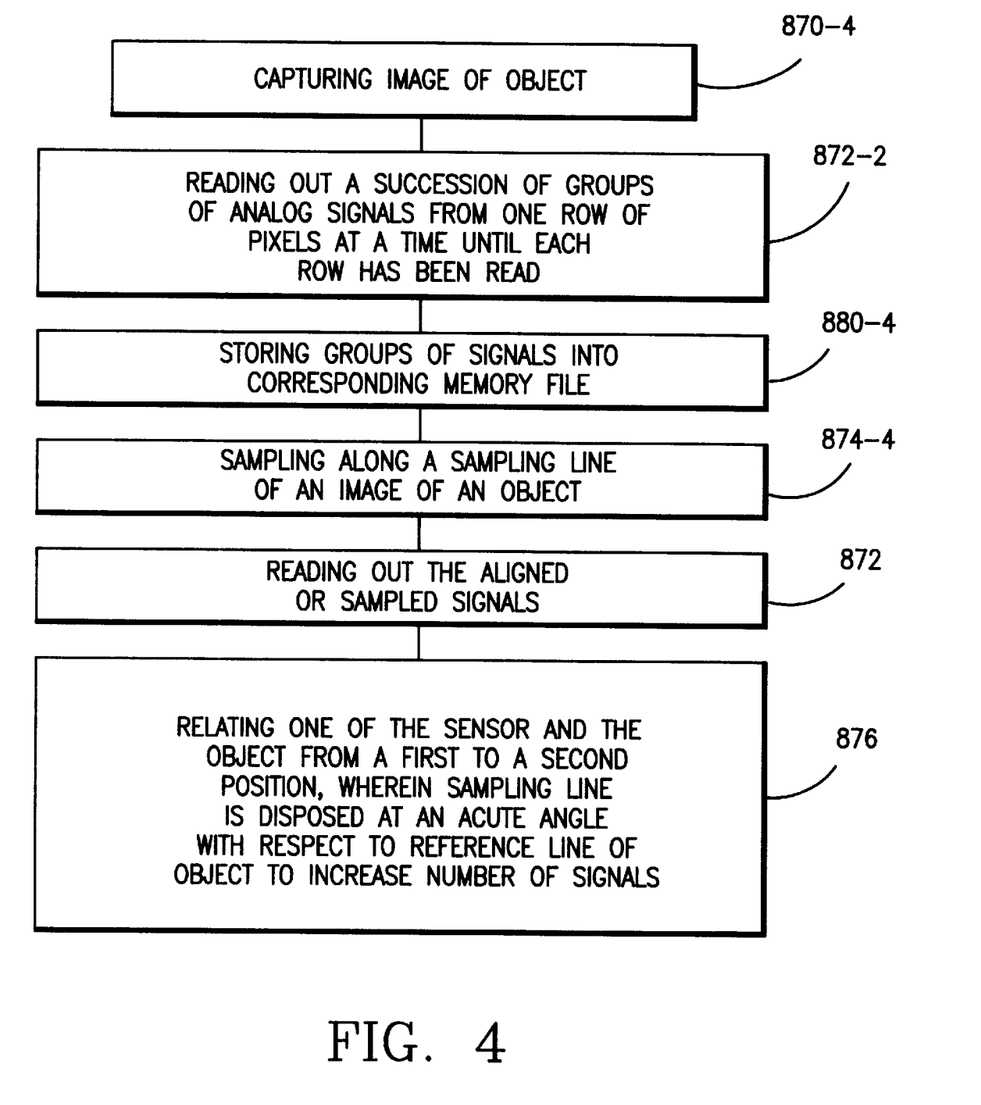

The bar code image 856 can automatically be normalized before decoding for example, by detecting in step 872 the linear segments or bar code elements 864 or 862. These detected signals are stored in step 880 in the memory cells 866. The presence of an object or a figure is detected in step 870-5 as a dark or present pixels. The pixels are processed to establish the slope of the elements of the bar code. Such an algorithm can be designed to quickly locate a dark bar as a first step. For example, the digital memory 850 may contain a bar code image representing a bar code three centimeters long by 1.7 centimeters tall, and within the area field 810 of view four centimeters by four centimeters. By exploring the horizontal lines or rows 852 of the memory cells 866 at one centimeter intervals in steps 874-3, -4, and -6 and then exploring the vertical lines or columns 854 of memory cells 866 at one centimeter intervals, a given line of memory cells 866 could be identified with the largest number of black pixels, (e.g. each assigned a value of one). The notation 874-3 indicates that the step 874 in FIG. 3 is referenced. By selecting a sequence of black cells 866, i.e., those cells 866 loaded with a "1" indicative of the presence of a bar code element, along the selected line, and exploring memory cells 866 on each side of the selected memory line 854 or 852, the probable slope of a given black bar code element 862 or 864 could be quickly ascertained. A check would be to examine a set of memory cells 866 along a line at right angles to the probable slope of the bars. If such a line encountered the proper number of bars, the digital image could be rotated according to the probable slope value. A refinement would be to select a sequence of black cells along the selected line closest to the minimum bar width since the slope of a minimum width bar is more accurately determined in a minimum of steps. Once the bars were approximately vertical in memory, spaced horizontal lines of memory cells could be examined, and further rotational correction could be effected if desired.

If several spaced lines of memory cells did not render the same bar code number, once the bar code image was normalized, the image could be discarded, and a further image examined. Voice synthesis means could instruct the user to aim the automatic reader up or down, left or right, if the bar code image was found to be only partly registered in image memory.

Figure 5:
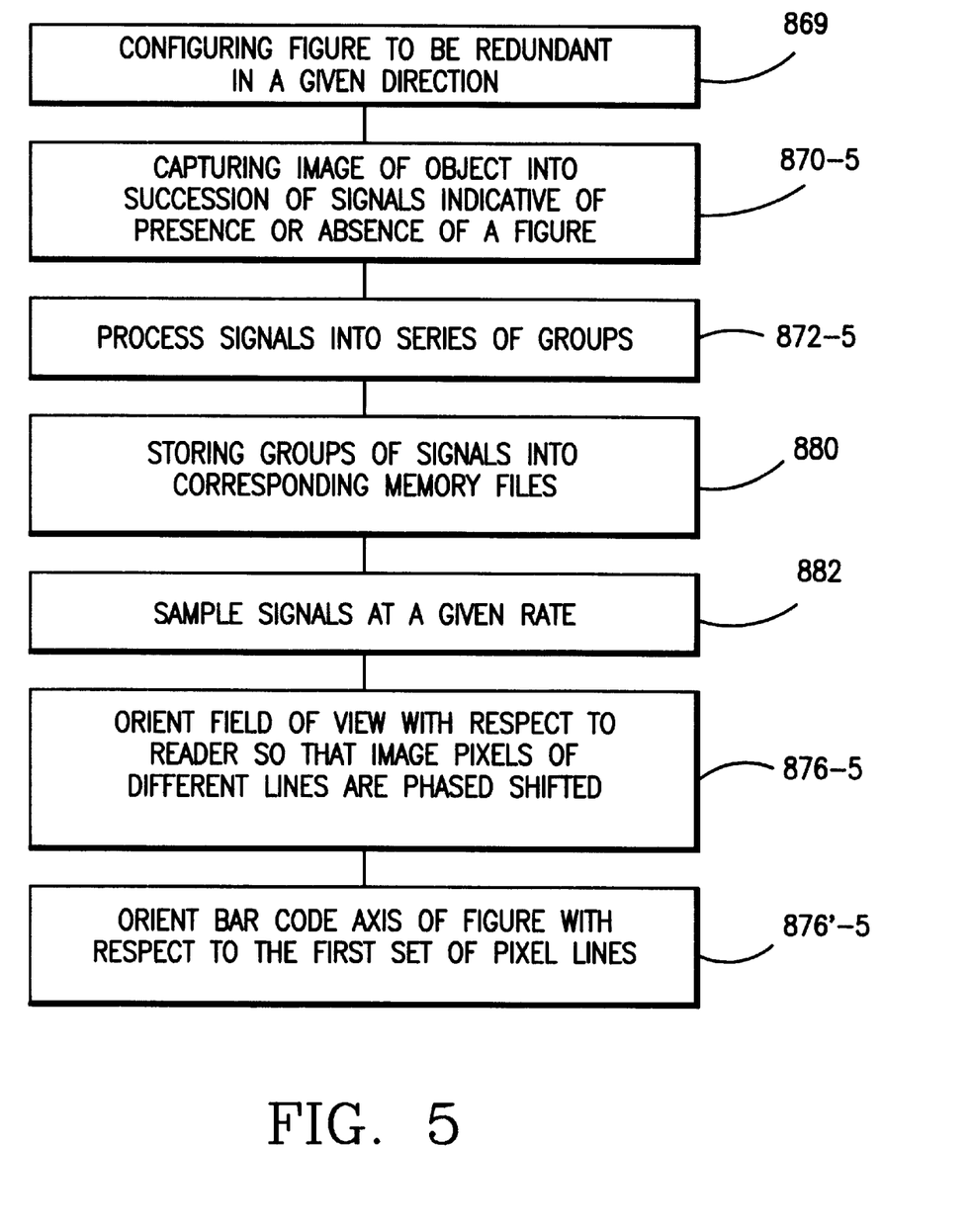
Figure 6:
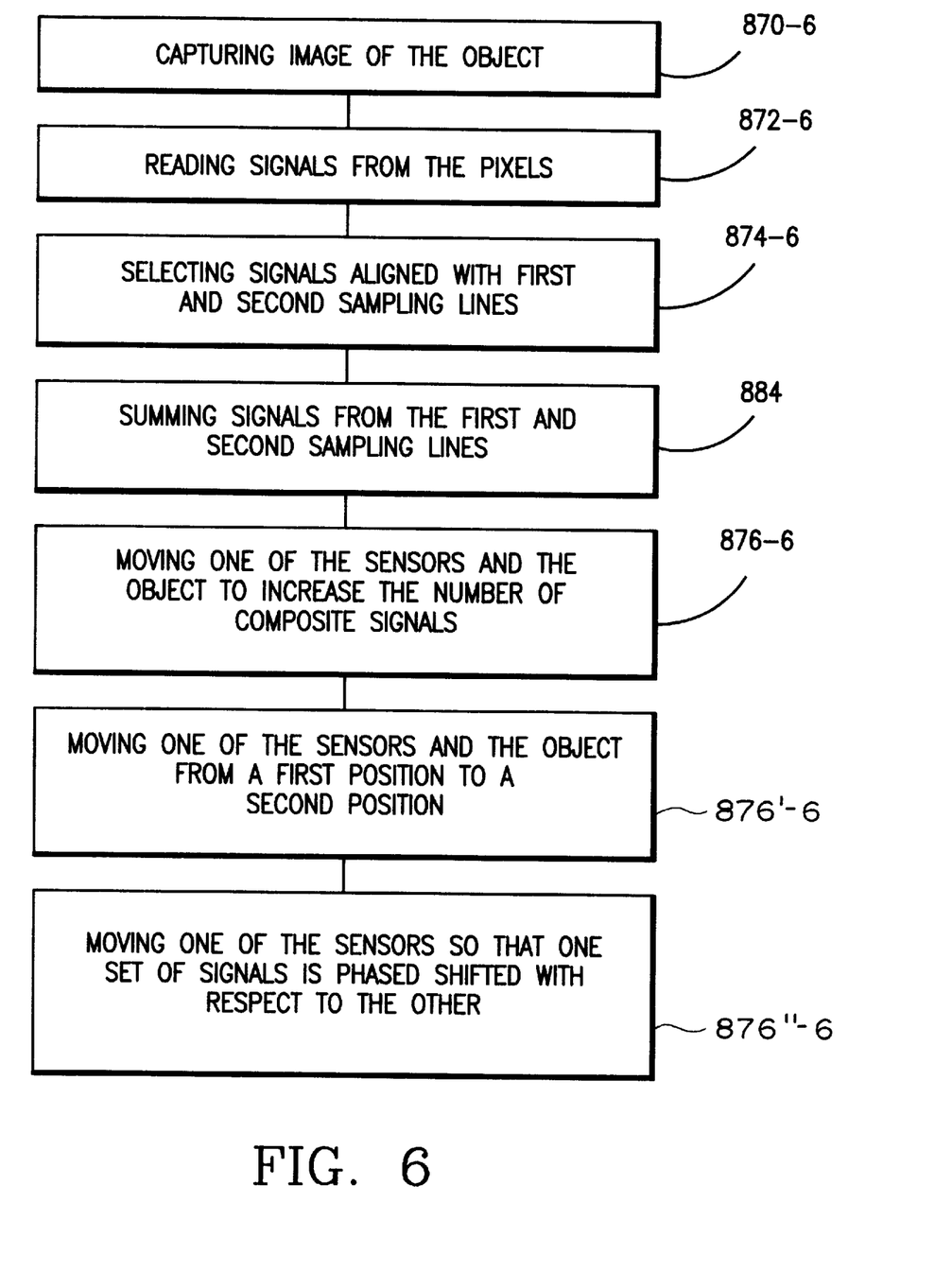

The storage of the digital signals, in step 880 in FIG. 6 i.e., the image pixels, representative of the bar code 856 in the memory 850 not only facilitates the rotation or normalization of its lines of stored pixel image with respect to one of the sets of memory lines 852 or 854, but also to process that pixel data as shown in FIGS. 3–6 comprising that stored image. Defects in the pixel data may result from some distortion in the bar code as printed or otherwise rendered on the label 830 or from noise occurring in the electronic process of sensing, storing or processing of the electrical signal representing the bar code image 856. Preferably, the image 820 of the object or figure focused onto the photosensor array 816 includes the entire height of each of the bar code elements 862 and 864. The configuring of the pixel data in step 869 of FIG. 5 provides redundant data which is subsequently processed to reject an image pixel if it is not consistent with a corresponding image pixel in that particular bar code element 862 or 864, to provide an indication preferably in the form of an electrical signal of the degree of confidence or accuracy of the sensed pixel image data, to make a decision that certain pixel image data is in error and to discard it, or to increase the resolution of the processed pixel data.

In the illustrative embodiment where the image of the bar code 856 is normalized such that its code axis 860 lies parallel to the horizontally oriented memory lines or rows 852, the contemplated processing comprises the examination of the pixel image data stored in the memory cells 866 oriented in a plurality of the vertically disposed memory lines 854. In a first, relatively simple type of processing, corresponding image pixels, i.e., those pixels as taken from adjacent horizontal memory lines 852 and located in a single vertically oriented memory line 854, are compared and if identical, i.e., two "1s" as indicative of the presence of a bar code element, there is a strong indication or probability of the presence of a bar code element. If the compared pixels are a "1" and a "0", then there is a lesser probability of the presence of a bar code element. On the other hand if the compared pixels are both "0s", there is a strong probability of the absence of a bar code element.

In a "voting" type of processing, the corresponding image pixels of at least 3 horizontal lines 852 are sampled and if a majority of the sampled pixels, e.g., 2 corresponding pixels are "1s", the pixel data is accepted at that point along the horizontal line as being indicative of the presence of a valid bar code element. In a third type of processing, the plurality of corresponding image pixels are spatially filtered. Such filtering is particularly useful to detect processing noise, which is typically relatively small in dimension, i.e., in the order of the width of a pixel image element. A sequence of corresponding images with such noise imposed thereon is applied to a low pass filter which effectively removes the relatively high frequency components attributable to such noise to produce a signal indicative of a bar code element without the superimposed noise.

In a further type of processing, as will be explained with respect to FIG. 3 the typical inability to position the hand-held scanner 812 so as to perfectly align the stored code image so that its axis 860 lies parallel to the horizontal memory lines 852 and the redundancy provided by configuring in step 869 the object or figure and by examining a series of the horizontal memory lines 852 as they intersect the leading and trailing edges of the bar code elements 862 and 864 permit a process for determining the positions of the leading trailing edges of these bar code edges with a high degree of precision. Typically, the hand-held scanner 812 and its photosensor array 820, as well as the image memory 850 used in the processing of the image pixel data have a resolution which is limited by economic restraints. For example, the resolution of the photosensor array and/or the memory or the rate at which sampling of the pixel data is taken, may be increased. Such improvements in resolution and sample rate typically involve increased cost. The problem then is to improve the accuracy of detecting the leading and trailing edges of the bar code elements without increasing the cost of the employed apparatus. An object of this process is to achieve a resolution in the detection of the leading and trailing edges and the width of the bar code elements 862 and 864 in excess of that normally expected of the relatively low resolution elements employed.

When the axis 860 of the bar code image 856 is rotated with respect to the rows or memory lines 852 in steps 876-3, 876-4, and 876-5, in particular as shown in FIG. 1C, a relative "phase shift" occurs in step 876-5 between the corresponding image pixels of the leading and/or trailing bar code edges as stored in a succession of the vertically oriented pixel cells of a given column 854, one pixel image being disposed in each of the horizontal memory lines 852. In general, each pixel cell 866 of the memory 850 is smaller than a bar code element 862. Typically at minimum, 5 or more cells 866 are required to allow multiple samples of the narrow bar 862 to be captured for decoding. If an image pixel of the array 820 is covered to certain degree, which is consistent for each pixel of the array 820 (for example 50%), a "1" indicative of a present image pixel will be outputted by the hand-held scanner 812 and stored in the corresponding cell 866 of the memory 850.

A further embodiment of the processing the pixel image data in accordance with this invention does not need to rotate or normalize the bar code image, but rather uses steps 876-3, -4, -5 and -6 to rotate the image of the bar code image 856 by step 870 as shown in FIG. 3 and configuring the object in step 869 with the vertical redundancy of the bar code element 862 or 864, as shown in FIG. 1C, to achieve improved accuracy of the bar code image. As shown in FIG. 1C, rows 852-7 to 17 traverse one or more of the bar code elements 862 and 864. The rotation or orientation in step 876 of the bar code image 854 causes the point of intersection between a row 852 and its leading (and trailing) edge of adjacent rows to shift. This slight shift in phase provides a mechanism for increasing the accuracy of detecting the edges of the bar code elements 862 and 864. In turn, more accurate edge detection increases the resolution of the scanner 812 without employing a photosensor array 816 of greater density or pixel image sampling circuit of greater rate, appreciating that such improved elements density and/or rate would also increase the cost of the scanner 812 and its associated pixel image processing circuitry.

Figure 2A:
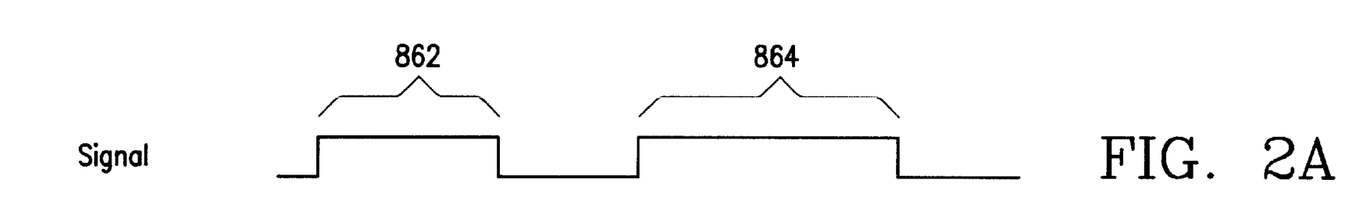
FIGS. 2A, B and C respectively represent an image pixel signal read out from the memory of FIG. 1C, a relatively slow sample clock, and a resultant undersampled signal obtained as the result of such sampling.

As discussed above, the image of the object is captured in step 870 of FIG. 3 on the array 820 of pixels. In processing as shown in FIG. 3, an image is captured in step 870 and an analog signal is read out in step 872 typically from one row 852 at a time until each row 854 has been read in step 872-3 and -6. FIG. 2A illustrates that analog signal as approximating a squarewave, where its relatively narrow pulse corresponds to the reading of the bar code element 862 of narrow width and its wider pulse represents the bar code element 864 of a wider width. If one of the bar code elements 862 or 864 covers at least 50% of one of the pixels 866, the corresponding signal as shown in FIG. 2A will go to its high or "1" state. Appreciating that the relative dimensions of the bar code elements 862 and 864 would be larger than that represented in FIG. 1C, the minimum width of a narrow bar code element 862 would span at least 5 image pixels 866.

Figures 2B, 2C:
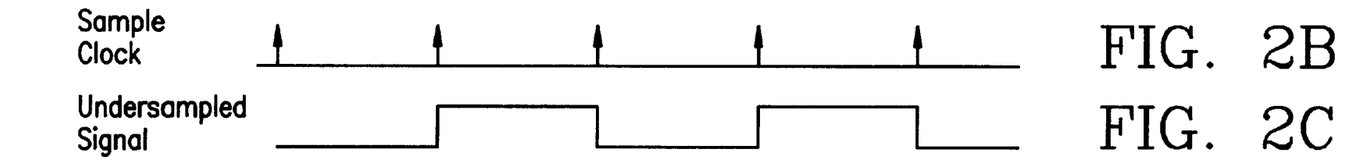

The analog pixel image signal of FIG. 2A needs to be sampled along a sample line in step 874-3 and -4, e.g., along a row 852 as described above, to permit further digital processing thereof. FIGS. 2B and C illustrate respectively a clock sample signal and the resultant sampled signal. The sampling rate as set in step 882 of the signal shown in FIG. 2B corresponds approximately to the pulse width of the signal corresponding to the narrow bar code element 862. According to the Nyquist sampling criteria, a bandlimited signal need only be sampled at twice the highest frequency component for reconstruction or manipulation of that signal. A square wave signal, such as that pixel image signal shown in FIG. 2A, may be thought of in two ways. First, a true square signal is not band limited to a frequency close to the fundamental frequency of the signal. If the square wave is considered to be bandlimited to nearly the frequency of the fundamental frequency, then 2 samples of the Nyquist limit are theoretically required. As illustrated in FIG. 2B, such sampling would provide only 1 sample for the narrow bar code element 862 and 1 sample for the narrower space between the elements. Such a sampling rate provides that undersampled signal shown in FIG. 2C. The accuracy of the undersampled signal is low, suffering from a relatively low sampling rate.

Actually, the real issue is the sampling frequency versus phase error, where any deviation from the actual bar code element or its edges looks like a phase shift from normal. Increasing the sampling frequency will result in an equivalent phase error characteristic.

Figures 2D, 2E:
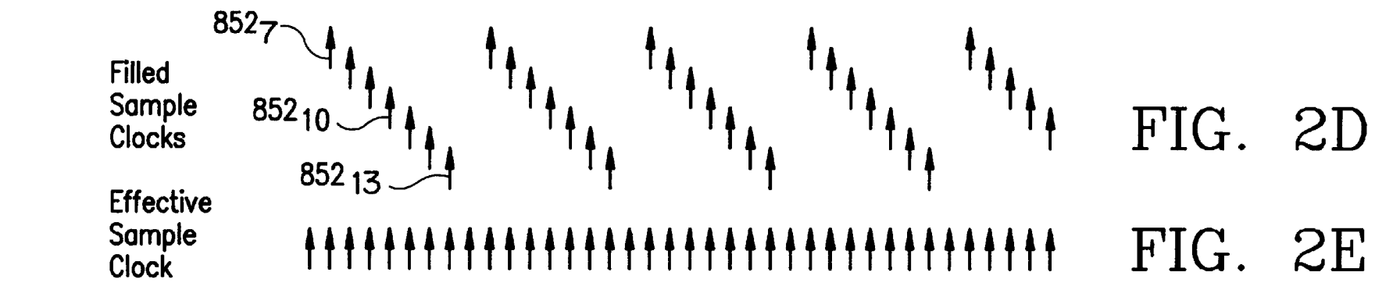
Figure 2F:
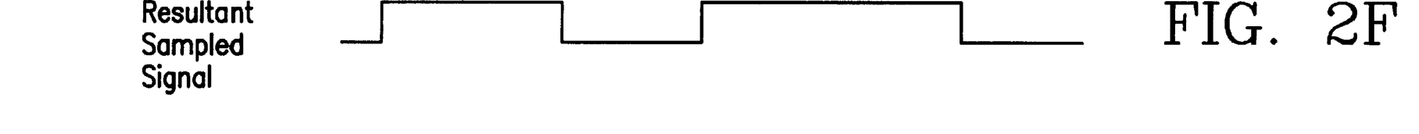

As will now be explained, with respect to FIG. 3 the configuring of the figure in step 869 with vertical redundancy of the bar code elements 862 and 864 provides a way of increasing the sampling rate of these elements. Image pixel processing is effected by redundantly reading out in step 872-3 the analog pixel image signals from each of the horizontally disposed rows 852-7 to 852-15 of the bar code image 856 as shown in FIG. 1C. Since each signal represents the same bar code elements 862 and 864, taken only at a different vertical position, the signals should closely resemble that shown in FIG. 2A. As shown in FIG. 2D, the sampling in step 874 and outputting of analog signals from adjacent rows 852-7 in steps 872 and 874 to 15 in steps 872-3 and -4 and the rotation in step 876 of the image of the bar code 856 in step 870 or object with respect to the sampling line, i.e., one of the rows 852 as explained above, has the effect of shifting in steps 876-5 and -6 the samples of the image signal and, as represented in FIG. 2E, fills in the sample clock. The sampled signals derived in step 872 from sampling in step 874-6 the signals at rows 852-7 to 852-15 as shown in FIGS. 2B and D, are combined in step 884 to produce the resultant signal shown in FIG. 2F. As shown in FIG. 2F, the resultant sampled signal is a significantly more accurate rendering of the original pixel image signal than that shown in FIG. 2C. The accuracy and the sampling rate has been effectively increased by a factor corresponding to the number rows 854 which were read.

It will be apparent that features of the various embodiments illustrated or described herein may be combined, and that various of the features may be utilized independently of others, and that many further modifications and variations may be effected without departing from the scope of the teachings and concepts of the present disclosure.

I claim:

1. A method of operating an image reader to capture within a field of view and to process in a memory an image of a figure having a peripheral boundary to render the peripheral boundary with improved definition, the memory comprising a plurality of memory files, the image reader including a plurality of image pixels arranged in an array, the array comprised of first and second sets of intersecting lines, said method comprising the steps of:
    a) operating the image reader to convert the image of the field of view into a succession of electrical signals of first and second types indicating respectively the presence or absence of the figure within the field of view;
    b) processing said succession of electrical signals into a series of groups, each group corresponding to a successive scan of the array;
    c) storing each of said groups successively into a corresponding file of the memory;
    d) sampling at a given rate said electrical signals stored in a particular file; and
    e) orienting the field of view image with respect to the image reader so that said sampled electrical signals as stored in memory and representing different lines of the one set of the image pixels are phase shifted with respect to each other and that the image resolution is improved.

2. A method of operating an image reader as claimed in claim 1, wherein there is included the step of configuring the peripheral boundary of the figure to be redundant at least in a given direction with respect to the figure.

3. A method of operating an image reader as claimed in claim 1, wherein the figure is a bar code comprising a series of bars disposed parallel to each other, the width of each bar and the spacing between adjacent bars defining the information coded by the bar code, the series of bars having an axis disposed perpendicular to the bars, and the step of orienting orients the field of view so that the bar code axis is disposed at an angle with respect to the lines of the first set so that said groups of successive electrical signals indicative of corresponding image pixels of adjacent scans are stored in corresponding memory files and phase shifted with respect to each other.

4. A method of increasing the apparent resolution of an image of at least one object captured by an image sensor, the sensor including a plurality of lines of pixels arranged in an array thereof and having a given density, the object including redundant information and a plurality of elements rendered selectively in at least first and second states, said method comprising the steps of:
    a) capturing a two-dimensional image of the object;
    b) outputting electrical signals from the pixels and selecting those electrical signals which are outputted by the pixels aligned with at first and second sampling lines and represent the object elements of the first state of the captured object image;
    c) summing said electrical signals outputted by the pixels aligned with each of said first and second sampling lines to provide a composite signal; and
    d) moving one of the sensor and the object with respect to the other to thereby increase the number of said electrical signals of said composite signal based on the redundant information by selectively determining the relative orientation of said sampling line and said captured image and to increase the apparent resolution of the object image.

5. The method of increasing the apparent resolution of an image as claimed in claim 4, wherein the array of pixels is disposed in rows and columns at the points of intersection thereof.

6. The method of increasing the apparent resolution of an image as claimed in claim 5, wherein said sampling line is aligned with respect to a selected one of the rows and columns, whereby the number of sampled signals along said sampling line realized in said second position is greater than the number of sampled electrical signals per unit measure along said sampling line realized in said first position.

7. The method of increasing the apparent resolution of an image as claimed in claim 4, wherein there is further included a memory connected to receive from the pixel array the sampled electrical signals from the corresponding pixels, the memory having a plurality of cells and there is further included the step of storing the sampled electrical signals in selected memory cells corresponding to the pixels of the array.

8. The method of increasing the resolution of an image as claimed in claim 7, wherein said step c) further includes the transfer of the electrical signals from one set of cells to another set of cells, before sampling said electrical signals in said other set cells along said sampling line.

9. The method of increasing the apparent resolution of an image as claimed in claim 4, wherein there is further included a step of arranging selected of said plurality of object elements along a first direction, and other of said plurality of said object elements to represent the redundant information in a second direction transverse to the first direction.

10. The method of increasing the apparent resolution of an image, as claimed in claim 9, wherein said step c) determines the relative orientation so that said sampling line traverses said first direction.

11. The method of increasing the apparent resolution of an image as claimed in claim 10, wherein said step c) determines a first relative orientation so that said sampling line is aligned with said first direction whereby a first number of output signals is outputted by the pixels and a second relative orientation so that said sampling line is aligned with said second direction whereby a second number greater than said first number of output signals is outputted by the pixels.

12. The method of increasing the apparent resolution of an image as claimed in claim 9, wherein the image is a bar code comprising a series of bars in the form of one of the objects, each bar having a bar axis, there is included a further step of arranging said second direction aligned with respect to the bar axis, and said step c) determines the relative orientation so that said sampling line traverses said first direction.

13. A method of increasing the apparent resolution of an image of at least one object captured by an image sensor, the sensor including a plurality of pixels arranged in an array thereof and having a given density, the object including at least one reference line, redundant information and a plurality of elements rendered selectively in at least first and second states, said method comprising the steps of:

a) capturing a two-dimensional image of the object;

b) outputting electrical signals from the pixels and selecting those electrical signals which are outputted by the pixels aligned with a sampling line and represent the object elements of the first state of the captured object image; and c) increasing the number of said electrical signals based on the redundant information by selectively determining the relative orientation of said sampling line and said captured image by rotating one of the sensor and the object with respect to the other from a first position to a second position whereat said sampling line is disposed at an acute angle with respect to said reference line, whereby the apparent resolution of the object image is likewise increased.

14. A method of increasing the apparent resolution of an image of at least one object captured by an image sensor, the sensor including a plurality of pixels arranged in an array thereof and having a given density, the object including at least one reference line and a plurality of elements rendered selectively in at least first and second states, said method comprising the steps of:

a) sampling along a sampling line an image of the object;

b) outputting electrical signals from the pixels and selecting those electrical signals which are outputted by the pixels aligned with said sampling line and represent the object elements of the first state of the captured object image; and c) increasing the number of said electrical signals by selectively determining the relative orientation of said sampling line and said image by rotating one of the sensor and the object with respect to the other from a first position to a second position whereat said sampling line is disposed at an acute angle with respect to said reference line, whereby the apparent resolution of the object image is likewise increased.

15. The method of increasing the apparent resolution of an image as claimed in claim 4, where in step d) the moving of one of the sensors and the object with respect to the other from a first position to a second position whereat said first and second sampling lines are disposed at an acute angle with respect to said reference line.

16. The method of increasing the apparent resolution of an image as claimed in claim 4, where in step a) the moving of one of the sensors and the object with respect to the other so that said sampled electrical signals representing said first and second sampling lines of the one set of the image pixels are phase shifted with respect to each other.

* * * * *